United States Patent [19]

Klufas

[11] Patent Number: 4,538,455
[45] Date of Patent: Sep. 3, 1985

[54] METHOD AND APPARATUS FOR AXIALLY ALIGNING THE COUPLED SHAFTS OF A STEAM TURBINE

[75] Inventor: Oleg Klufas, Schenectady, N.Y.

[73] Assignee: General Electric Company, Schenectady, N.Y.

[21] Appl. No.: 604,801

[22] Filed: Apr. 27, 1984

[51] Int. Cl.³ .......................................... G01M 19/00
[52] U.S. Cl. ..................................... 73/118; 33/181 R
[58] Field of Search ........................ 73/118; 33/181 R

[56] References Cited

U.S. PATENT DOCUMENTS

| | | | |
|---|---|---|---|
| 4,033,042 | 7/1977 | Bently | 33/181 R |
| 4,115,925 | 9/1978 | Malak | 33/181 R |
| 4,428,126 | 1/1984 | Banks | 33/181 R |

*Primary Examiner*—Anthony V. Ciarlante
*Attorney, Agent, or Firm*—John F. Ahern; Paul Checkovich

[57] ABSTRACT

A method and apparatus for axially aligning axially coupled shafts of a steam turbine includes means for changing the elevation of the outboard end of each shaft. The outboard end of each shaft is rotatably supported by a bearing above a turbine foundation. Means is included for measuring the supporting force at the bearing. A strain gauge is disposed on the surface of each shaft which provides an output signal indicative of the degree of bending of that shaft. The apparatus includes means for comparing and minimizing the output signals of the strain gauges by affecting the means for changing the elevation and comparing the resultant output signals at different levels of elevation. The method for axially aligning two axially coupled shafts includes measuring the degree of bending on the surface of the shaft, changing the elevation of the outboard end of each shaft, measuring the supporting force at each bearing at each outboard end of the shaft, comparing the signals representative of the bending at different levels of elevation, minimizing the signals, and repeating the step of changing the elevation and the step of comparing the signals, and recording the supporting forces during the minimization step to obtain the optimal axial alignment of the axially coupled shafts.

6 Claims, 3 Drawing Figures

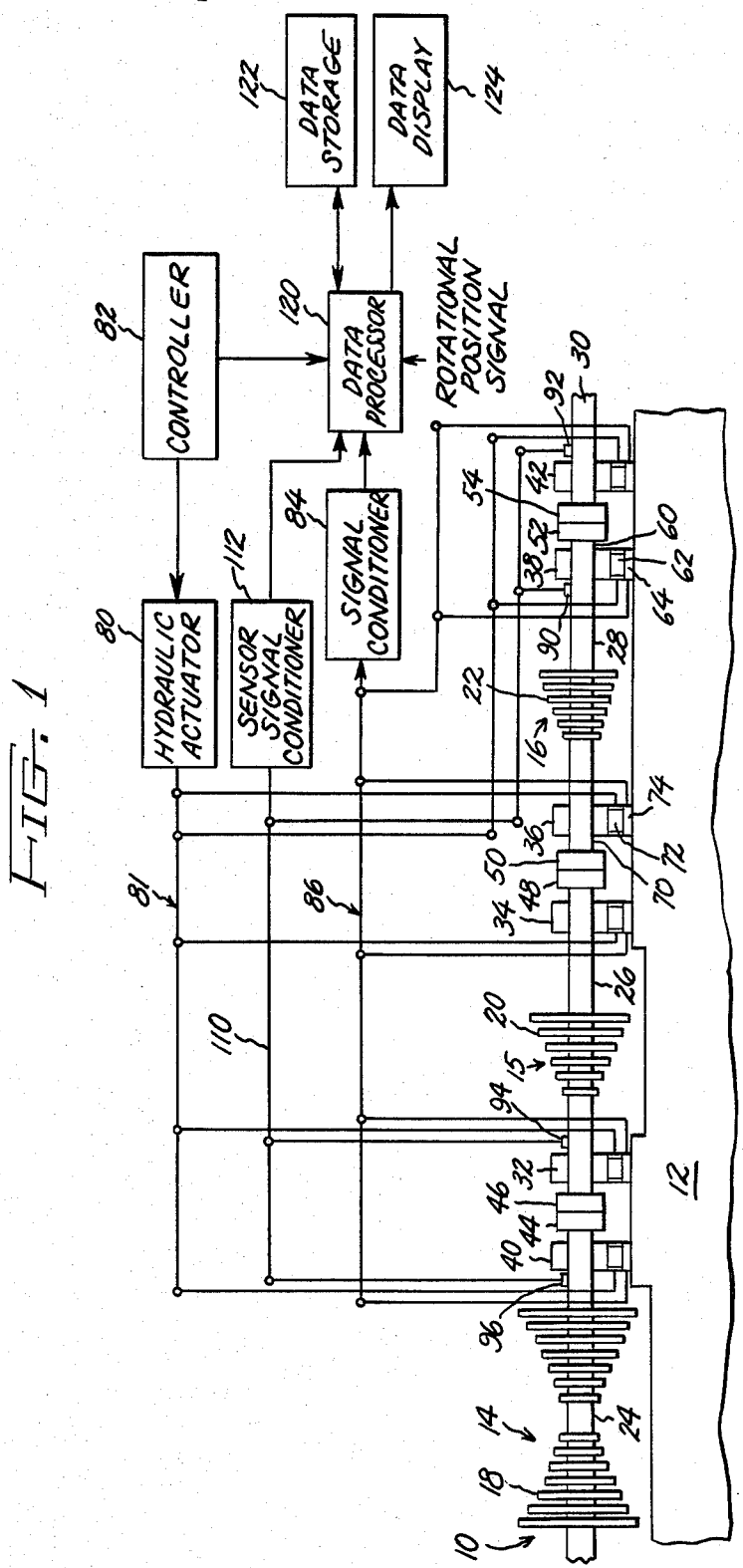

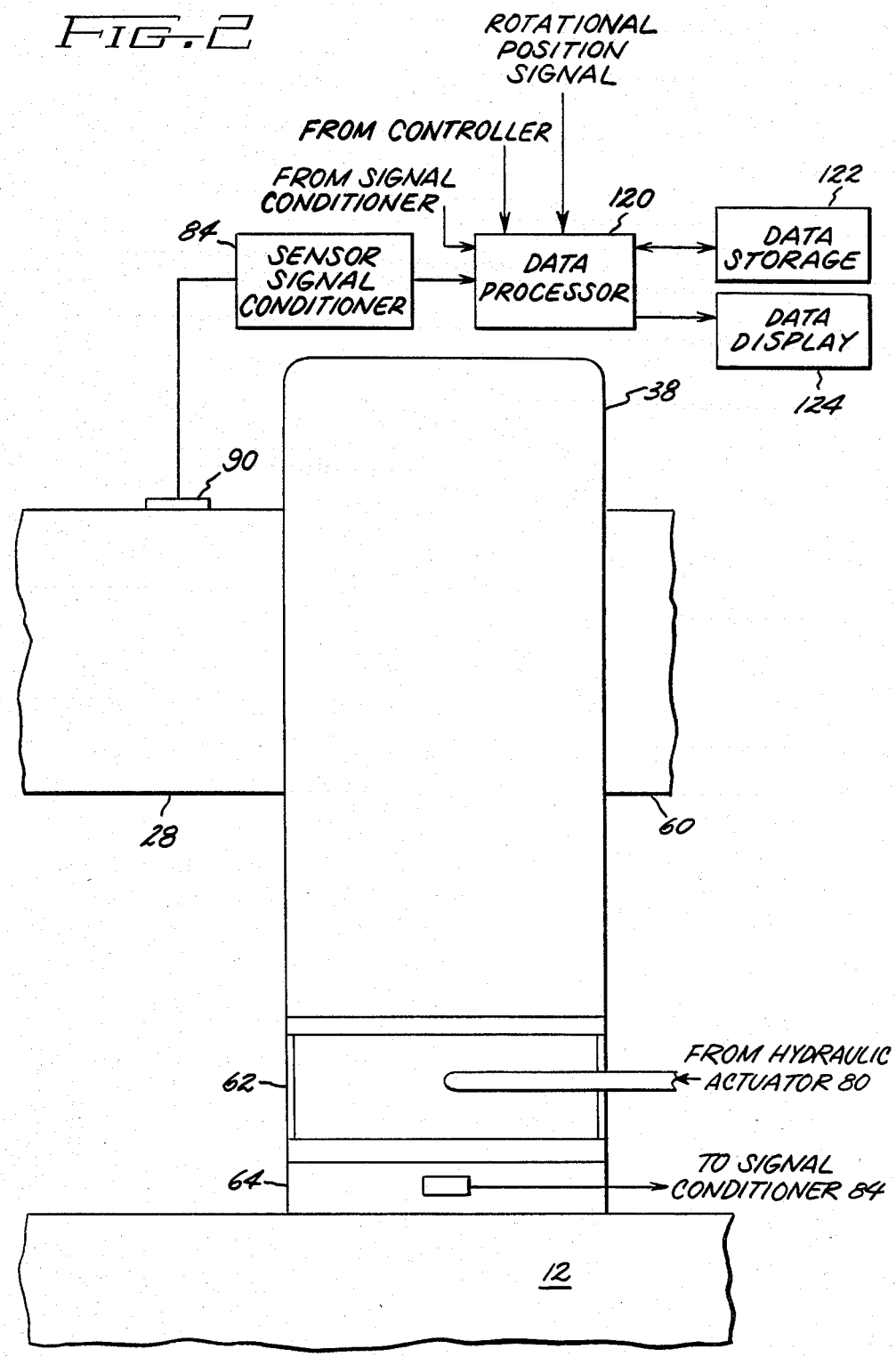

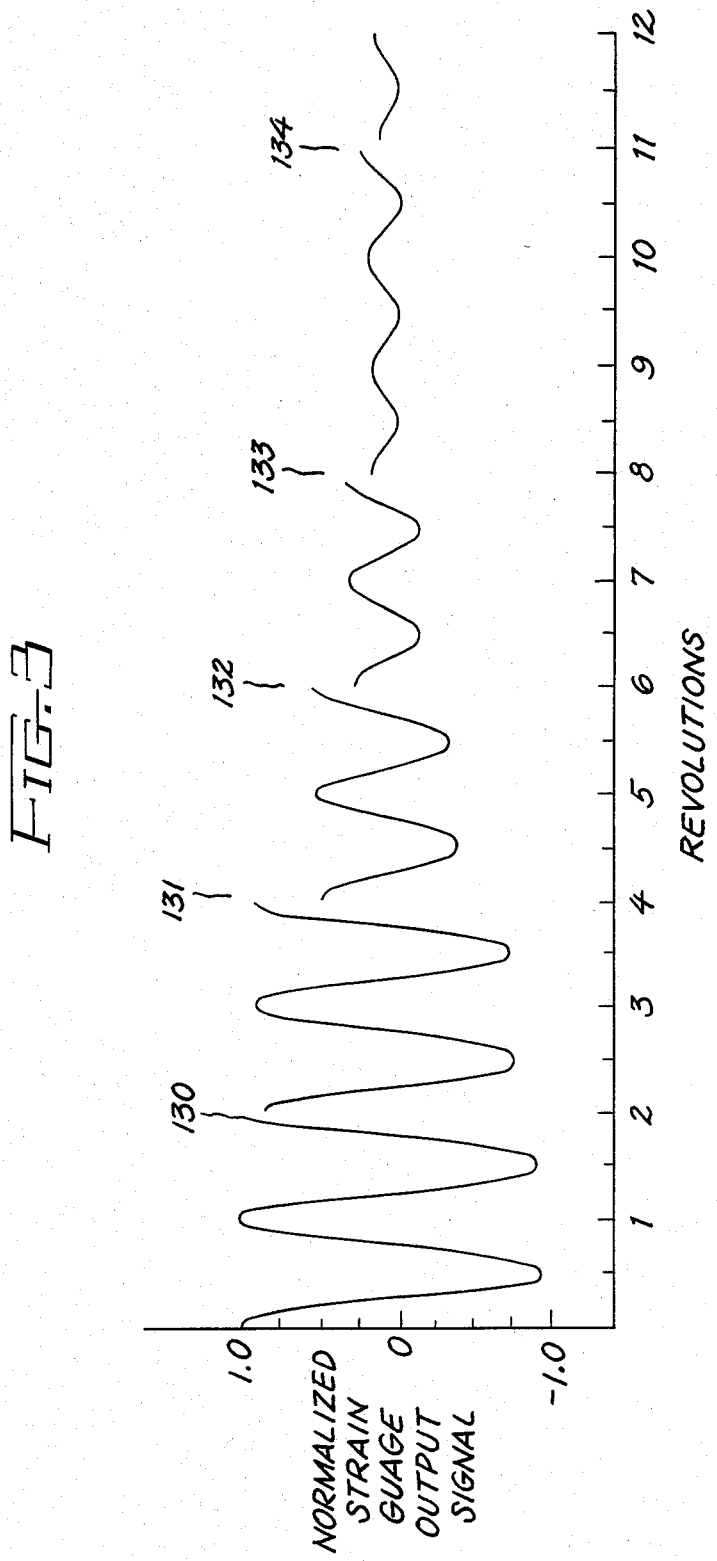

4,538,455

METHOD AND APPARATUS FOR AXIALLY ALIGNING THE COUPLED SHAFTS OF A STEAM TURBINE

BACKGROUND OF THE INVENTION

This invention relates generally to a method and an apparatus for axially aligning a plurality of axially coupled shafts of a steam turbine.

In power plants utilizing steam turbines, a plurality of shafts are axially coupled together. Each shaft carries a plurality of steam turbine blades. High pressure and high temperature steam flowing past these turbine blades experiences an enthalpy change which causes the turbine blades to rotate the shaft. Some power plants include a number of turbines, such as a high pressure turbine, an intermediate pressure turbine, and a low pressure turbine. The various shafts associated with these turbines are axially coupled together and the rotational power developed by each turbine is transmitted to a dynamoelectric machine such as an electromagnetic generator. The generator may also be axially aligned with the shafts. As used herein, the term "axial alignment" is meant to refer to that alignment within certain predetermined tolerances recognized by a person of ordinary skill in the art. In another sense, the term "axially aligned" is meant to refer to items in substantial axial alignment. As recognized by a person of ordinary skill in the art, the axial centerline of a particular steam turbine component varies along the longitudinal aspect of the component due to manufacturing and other design related issues. Therefore, the axial centerline of a steam turbine shaft is within certain tolerances and the axial alignment of two steam turbine shafts must be within the industry recognized standards.

At the initial commissioning of the steam turbine power plant, each turbine shaft is aligned with the other turbine shafts and, if necessary, with the shaft of the electric generator. Each shaft is axially coupled at its outboard end to the adjacent outboard end of another shaft. The axial alignment of the entire system is important due to mechanical considerations as well as efficiency considerations. After a period of time, the steam turbine plant may need refurbishment. At that time, each shaft is axially aligned with the balance of the steam turbine system before recommissioning the system.

OBJECTS OF THE INVENTION

It is an object of the present invention to provide a method and apparatus to axially align the axially coupled shafts of a steam turbine power plant.

It is another object of the present invention to provide a method and apparatus to align the axially coupled shafts which utilizes very accurate and sensitive sensors only at the initial alignment of the shafts.

It is a further object of the present invention to provide for a method and apparatus for axially aligning a steam turbine shaft and maintaining that alignment without utilizing sensitive sensors which are affected by the normal operation of the steam turbine system.

SUMMARY OF THE INVENTION

In one embodiment, the apparatus for axially aligning the axially coupled shafts of a steam turbine includes a means for changing the elevation of the outboard end of each shaft. Each shaft is rotatably supported by a pair of bearings above a turbine foundation. The bearings are disposed adjacent the axially outboard ends of the shaft and the means for changing the elevation is disposed between a respective bearing and the turbine foundation. Means for measuring the supporting force at each bearing is included in the apparatus. The supporting force is the force counteracting a portion of the weight of each shaft at the corresponding bearing. One strain gauge is disposed on the surface of each shaft. The strain gauge provides an output signal indicative of the degree of bending of the associated shaft. Means for comparing and minimizing the output signals of the strain gauges by affecting the means for changing the elevation of the outboard ends of the shafts is included in the axial alignment apparatus. The resultant output signals, sensed at different levels of elevation, are compared and the elevation of the ends of the shaft is changed until those output signals are minimized. The supporting force at each bearing is noted at the minimized output signal and the optimal axial alignment of the shafts is maintained by simply maintaining that recorded supporting force. The strain gauges are removed from the surfaces of the shaft since those devices are greatly affected by the normal operation of the steam turbine system.

One method for axially aligning the axially coupled shafts includes measuring the degree of bending on the surface of each shaft and providing a representative signal and changing the elevation of the outboard ends of each shaft at the corresponding bearing. The supporting force is measured at each bearing. The signals representative of the bending of each shaft are compared at different levels of elevation, and those signals are minimized by repeating the step of changing the elevation and the step of comparing the signals. By recording the supporting force at each bearing, the optimal axial alignment of the axially coupled shafts is achieved without the necessity of continually measuring the degree of bending on the surface of each shaft.

BRIEF DESCRIPTION OF THE DRAWINGS

The invention, together with additional objects and advantages thereof, is better understood by the following detailed description, however, the claims, appended to the concluding portion of the specification, distinctly point out and particularly claim the present invention, in which:

FIG. 1 illustrates an axial, schematic view of a number of shafts of a steam turbine axially coupled together;

FIG. 2 illustrates a small, cutaway, axial, schematic view of one turbine shaft in the region of the supporting bearing and the associated strain gauge and sensory signal system; and FIG. 3 illustrates one example of a graph comparing the normalized strain gauge output signal per revolution of the shaft.

DETAILED DESCRIPTION OF THE INVENTION

This invention relates generally to an apparatus and a method for axially aligning a plurality of axially coupled shafts of a steam turbine.

FIG. 1 illustrates, in schematic form, the axial view of three turbine shafts, a portion of another shaft, a control system and data acquisition and processing system in block diagram form. A steam turbine system 10 is set on foundation 12. In this embodiment, system 10 includes low pressure turbine 14, intermediate pressure turbine 15, and high pressure turbine 16. A person of ordinary skill in the art recognizes that turbines 14, 15 and 16 also include turbine shells, admission valves, and various other elements which are not shown in FIG. 1. Schematically illustrated in FIG. 1 is a plurality of steam turbine blades affixed to each turbine. Turbine blade 18 is schematically illustrated as part of the plurality of turbine blades associated with low pressure turbine 14, as is turbine blade 20 associated with intermediate turbine 15 and turbine blade 22 as part of high pressure turbine 16. The low pressure turbine blading is affixed to a shaft 24 of turbine 14. Turbine 15 includes shaft 26 and turbine 16 includes shaft 28. Another shaft 30 is part of steam turbine system 10 but is illustrated as cutaway to the right of FIG. 1.

Each shaft is rotatably supported at its axially outboard ends by a pair of bearings extending above turbine foundation 12. As used herein, the term "axially outboard" refers to regions of the steam turbine shaft in close proximity to the axial ends of that shaft. In contrast, each shaft includes an inboard region which separates the two axially outboard regions.

Shaft 26 is rotatably supported by bearing 32 at one axial end and by bearing 34 at the other axial end. Similarly, bearing 36 and bearing 38 rotatably support shaft 28. As illustrated in FIG. 1, shaft 24 is rotatably supported at one axial end by bearing 40 and shaft 30 is supported by bearing 42. Shaft 24 is axially coupled to shaft 26 by a coupling means which includes coupling sections 44 and 46. Other coupling sections 48 and 50 provide the axial connection between shaft 26 and shaft 28. Sections 52 and 54 are part of the coupling means between shaft 28 and shaft 30.

Means for changing the elevation of the outboard end of each shaft is part of the axial alignment apparatus. Therefore, outboard end 60 of shaft 28 is supported by bearing 38 and, in this embodiment, a hydraulic jack 62 is disposed between bearing 38 and foundation 12. Means for measuring the supporting force at outboard end 60 includes, in this embodiment, load cell 64. The term "supporting force" as used herein refers to that force which is required to counteract a portion of the weight of shaft 28 and any other associated elements supported by bearing 38. The other axial end 70 of shaft 28 is rotatably supported by bearing, 36. Between bearing 36 and foundation 12 another means for changing the elevation of outboard end 70 is disposed, which in this illustrated embodiment, is a hydraulic jack 72. Similarly, means for measuring the supporting force at bearing 36 is, in this embodiment, a load cell 74. The outboard end of each shaft is rotatably supported by a bearing and a hydraulic jack or other means for changing the elevation of that outboard end is disposed between the lower portion of the bearing and turbine foundation 12. Also, means is included for measuring the support force at each bearing which, in this embodiment, is a load cell disposed between the lower portions of each hydraulic jack and foundation 12. The other hydraulic jacks and load cells illustrated in FIG. 1 are not numerically referenced but those elements are substantially similar to hydraulic jacks 62 and 72 and load cells 64 and 74.

Hydraulic jacks 62 and 72 are supplied with hydraulic fluid from hydraulic actuator 80 through a system of supply lines generally referenced by supply line 81. It is important to note that FIG. 1 is a schematic and supply line 81 represents a plurality of individual supply lines hydraulically connecting actuator 80 to each hydraulic jack. In this sense, supply line 81 represents a number of individual supply lines running between actuator 80 and each hydraulic jack. In another view, supply line 81 could include a plurality of valves affected by actuator 80 thereby controlling the flow of fluid to each jack. Actuator 80 is supplied with control signals from a controller 82.

Load cells 64 and 74 generate signals indicative of the supporting force at that particular outboard end. That force, or load cell signal, is applied to signal conditioner 84 via line 86. Again, line 86 schematically illustrates a plurality of signal carrying lines between signal conditioner 84 and load cells 64, 74 and other load cells not numerically identified in FIG. 1. Also, a person of ordinary skill in the art recognizes that signal conditioner 84 may supply the load cells with power as well as accepting and conditioning the signals generated by load cells 64, 67 and the balance of the load cells.

One strain gauge is disposed on the surface of each shaft, hence, strain gauge 90 is removably mounted to shaft 28. Strain gauge 90, in this embodiment, is a resistance strain gauge which is utilized by persons of ordinary skill in the art knowledgeable about stress analysis. Strain gauge 90 provides an output signal indicative of the degree of bending of shaft 28. In a similar fashion, strain gauge 92, strain gauge 94 and strain gauge 96 provide output signals indicative of the degree of bending of shafts 30, 26 and 24, respectively. These output signals are supplied via bus 110 to sensor signal conditioner 112. Bus 110 schematically represents a plurality of individual electrical connections between conditioner 112 and stress gauges 90, 92, 94 and 96. Additionally, conditioner 112 may supply power to those strain gauges.

A data processor 120 is supplied with the various output signals of the strain gauges through sensor signal conditioner 112, the load cell output signals from the various load cells through signal conditioner 84, and a signal from controller 82 indicative of the different levels of elevation as determined by various hydraulic jacks. Data processor 120 also receives a rotational position signal which represents the rotational position of the axially coupled shafts 24, 26, 28 and 30. The output of data processor 120 is tied to a data storage 122 and a data display 124. Generally, data processor 120, data storage 122 and data display 124 are part of means for comparing and minimizing the output signals of the strain gauges by affecting the hydraulic jacks and changing the elevation of the outboard ends of various shafts.

FIG. 2 illustrates, in schematic form, a blown up, cutaway view of outboard end 60 of shaft 28. FIG. 2 clearly illustrates that strain gauge 90 is mounted on the surface of shaft 28. Also, FIG. 2 clearly illustrates load cell 64 disposed between hydraulic jack 62 and turbine foundation 12.

FIG. 3 illustrates one example of a graph comparing the normalized strain gauge output signal per revolution of a particular shaft developed during the minimization step of the axial alignment procedure.

One method of axially aligning axially coupled shafts 24, 26, 28 and 30 involves measuring the degree of bending on the surface of each shaft with strain gauges 90, 92, 94 and 96. By changing the elevation of outboard end 60 of shaft 28 by, for example, raising hydraulic jack 62, the degree of bending sensed by strain gauge 90 changes. This change occurs because of the axial distance between bearing 38 and bearing 36 and the different level of elevation between outboard end 60 relative to outboard end 70. In one embodiment, shaft 28 is rotated and the output signal from strain gauge 90 is plotted versus the rotational position of shaft 28. By normalizing the strain gauge output signal and placing the maximum strain gauge signal at the zero revolution position, a graph is developed as illustrated in FIG. 3. By changing the level of elevation of outboard end 60 relative to turbine foundation 12 and comparing the amplitude of the normalized strain gauge output signals at those various levels of elevation, a minimization of the degree of bending of shaft 28 occurs as noted by points 130, 131, 132, 133 and 134 in the graph of FIG. 3. Also, by changing the elevation of outboard end 70 by hydraulic jack 72, the output signal from strain gauge 90 changes correspondingly. By repeating the steps of comparing and minimizing the various strain gauge output signals at certain levels of elevation for each shaft, an optimum axial alignment can be achieved for axially coupled shafts 24, 26, 28 and 30. Data processor 120 manipulates and processes the raw data and relates the output signals to the levels of elevation which are supplied to that processor by controller 82. Data storage 122 supplies historical data to data processor 120 and data display 124, in one embodiment, generates a strip chart graph similar to the graph illustrated in FIG. 3. A person of ordinary skill in the art recognizes that two strain gauges could be removably mounted at each outboard end of each shaft. The output signals from that pair of strain gauges could be processed by data processor 120 in a more sophisticated manner than described herein to achieve a substantially similar result.

During normal steam turbine operation, strain gauges 90, 92, 94 and 96 would not provide accurate output signals indicative of the bending of the various shafts because of thermal contraction and expansion due to the great heat involved as well as output signal distortion due to the electrical and physical environment in steam turbine system 10. Therefore, the supporting force noted at the various load cells, such as load cells 64 and 74, are recorded when the optimal axial alignment has been achieved by comparing and minimizing the strain gauge output signals. Thereafter, the strain gauges are removed from the surfaces of the various shafts. The optimal axial alignment of axially coupled shafts 24, 26, 28 and 30 is substantially maintained by substantially maintaining the recorded forces from the various load cells throughout the steam turbine system.

The claims appended hereto are meant to cover the modifications apparent to persons of ordinary skill in the art. What is claimed is:

1. An apparatus for axially aligning at least two axially coupled shafts of a steam turbine, each said shaft being rotatably supported by a pair of bearings above a turbine foundation, one of said bearings being disposed adjacent the axially outboard end of each said shaft, said apparatus comprising:
    means for changing the elevation of the outboard end of each said shaft of said at least two axially coupled shafts, said means for changing the elevation being disposed between the respective bearing and said turbine foundation;
    means for measuring the supporting force at each said bearing, said supporting force counteracting a portion of the weight of each said shaft;
    a pair of strain gauges, one of said strain gauges being disposed on the surface of each said shaft, and each said strain gauge providing an output signal indicative of the degree of bending of the respective shaft; and
    means for comparing and minimizing the output signals of said strain gauges by affecting said means for changing the elevation of the outboard ends of said shafts and comparing the resultant output signals at different levels of elevation.

2. An apparatus as in claim 1, including means for rotating said axially coupled shafts, means for generating a signal representative of the rotational position of said axially coupled shafts, and means for relating said output signals to said rotational signal.

3. An apparatus as in claim 1, wherein said strain gauges being located in close proximity to said bearings, and said strain gauges being removably mounted on the surface of said shafts.

4. An apparatus as in claim 1, wherein said means for changing the elevation including a hydraulic jack means at each outboard end beneath the respective bearing, and said means for measuring said supporting force including a load cell means.

5. A method for axially aligning at least two axially coupled shafts of a steam turbine, each said shaft being rotatably supported by a pair of bearings above a turbine foundation, each bearing being disposed adjacent the axially outboard end of each said shaft, said method comprising the steps of:
    measuring the degree of bending on the surface of each said shaft and providing representative signals;
    changing the elevation of the outboard end of each said shaft at the corresponding bearing;
    measuring the supporting force at each said bearing, said supporting force counteracting a portion of the weight of each said shaft;
    comparing the signals representative of the bending of each said shaft at different levels of elevation;
    minimizing said signals representative of the bending by repeating said step of changing the elevation and said step of comparing the signals; and
    recording the supporting force during said minimizing step to obtain the optimal axial alignment of said axially coupled shafts.

6. A method as in claim 5, including the steps of:
    rotating said axially coupled shafts and providing a rotational position signal;
    relating said signals representative of the bending to said rotational position signal and providing a resultant signal; and wherein
    said minimizing step utilizes the amplitude of said resultant signal.

* * * * *